US009292754B2

(12) United States Patent
Shin et al.

(10) Patent No.: US 9,292,754 B2
(45) Date of Patent: Mar. 22, 2016

(54) METHOD FOR FACE RECOGNITION

(71) Applicant: SUPREMA INC., Seongnam-si (KR)

(72) Inventors: Ho Chul Shin, Seongnam-si (KR); Bo Gun Park, Seongnam-si (KR); Ki Deok Lee, Seongnam-si (KR); Jin Wook Yi, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 156 days.

(21) Appl. No.: 14/140,410

(22) Filed: Dec. 24, 2013

(65) Prior Publication Data
US 2014/0301599 A1 Oct. 9, 2014

(30) Foreign Application Priority Data

Apr. 4, 2013 (KR) .................. 10-2013-0036676

(51) Int. Cl.
G06K 9/00 (2006.01)
G06K 9/03 (2006.01)
(52) U.S. Cl.
CPC ............ G06K 9/036 (2013.01); G06K 9/00288 (2013.01)
(58) Field of Classification Search
CPC combination set(s) only.
See application file for complete search history.

(56) References Cited

U.S. PATENT DOCUMENTS 7,177,450 B2 * 2/2007 Tajima ........................ 382/118
7,327,891 B2 * 2/2008 Covell et al. ................. 382/224
7,885,531 B2 * 2/2011 Kim et al. .................... 396/153
7,889,892 B2 * 2/2011 Terakawa ..................... 382/118
8,547,449 B2 * 10/2013 Imamura .................... 348/222.1
8,773,548 B2 * 7/2014 Kobayashi et al. ........ 348/222.1
2006/0140614 A1 * 6/2006 Kim et al. .................... 396/153
2007/0091394 A1 * 4/2007 Sakayori et al. ............. 358/538
2007/0104374 A1 * 5/2007 Terakawa ..................... 382/190
2012/0002849 A1 * 1/2012 Tokuse ......................... 382/118
2014/0044348 A1 * 2/2014 Chen et al. ................... 382/159

FOREIGN PATENT DOCUMENTS

| JP | 2003-141541 | 5/2003 |
| JP | 2006-344236 | 12/2006 |
| JP | 2008-217335 | 9/2008 |
| JP | 2009-032117 | 2/2009 |
| JP | 2010-026630 | 2/2010 |
| KR | 10-2012-0095193 A | 8/2012 |

OTHER PUBLICATIONS

Office Action dated Mar. 27, 2014 for corresponding Korean Patent Application No. 10-2013-0036676 and its English summary provided by Applicant's foreign counsel.

* cited by examiner

Primary Examiner — Anand Bhatnagar
(74) Attorney, Agent, or Firm — Ladas & Parry LLP

(57) ABSTRACT

A method for a face recognition by a face recognition service server, includes receiving a face image that is photographed from a face registration terminal or a face recognition terminal; detecting a face area of the received face image; and quantifying at least one quality factor for the detected face area in order to determine whether the received face image is suitable as sample image required for face recognition. Further, the method includes selecting the received face image as the sample image required for the face recognition when the quality factor satisfies a predetermined quality criterion.

13 Claims, 7 Drawing Sheets

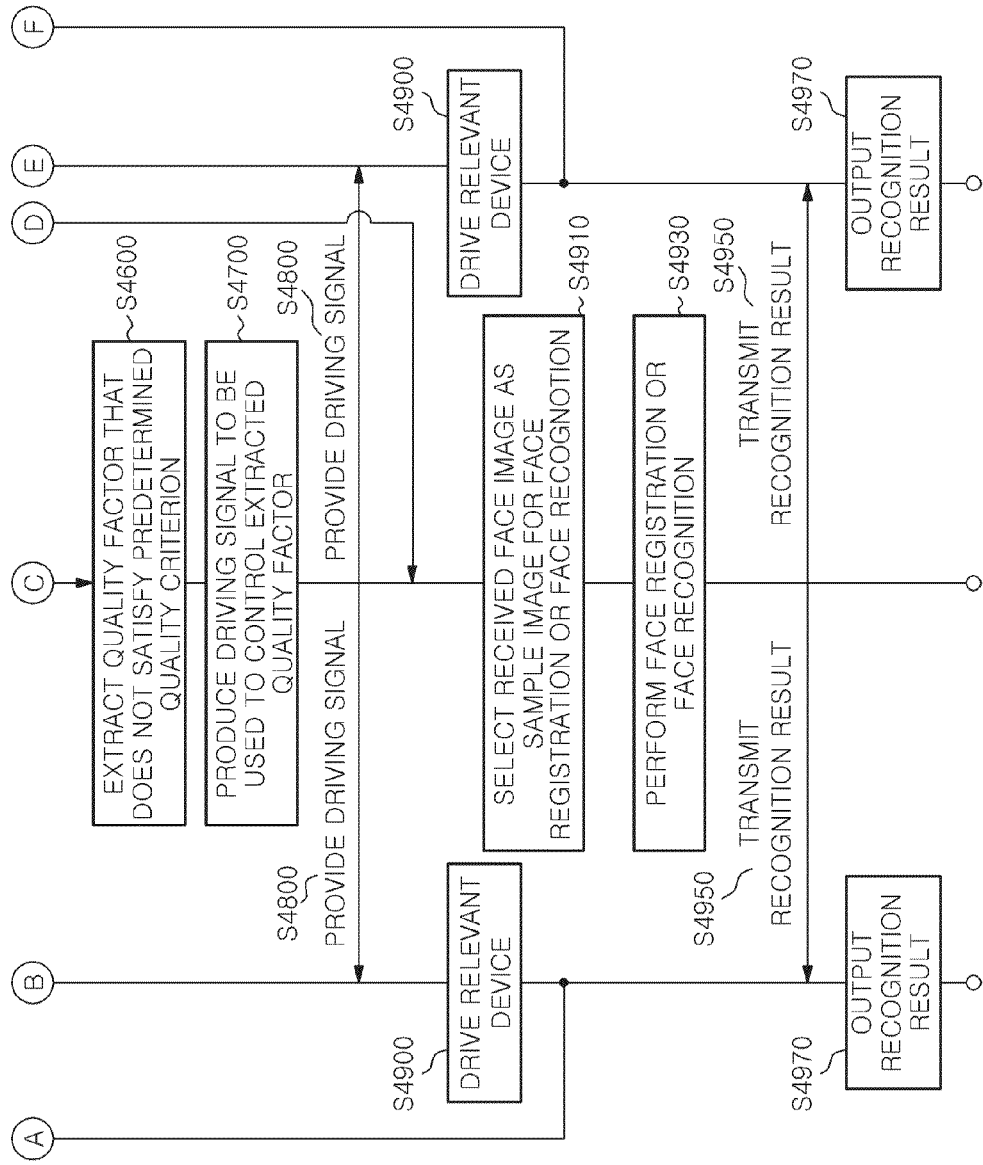

METHOD FOR FACE RECOGNITION

CROSS-REFERENCE TO RELATED APPLICATION(S)

The present invention claims priority of Korean Patent Application No. 10-2013-0036676, filed on Apr. 04, 2013, which is incorporated in its entirety herein by reference.

FIELD OF THE INVENTION

The present invention relates to a method for a face recognition; and more particularly, to a method for face recognition, capable of choosing a face image having a predetermined level or more as sample image necessary for face recognition or registration.

BACKGROUND OF THE INVENTION

Recently, there has been a growing tendency to maintain the security of companies or enterprises using facial recognition, in addition to fingerprint recognition, as the importance of the security increases. Thus, some organizations or enterprises are equipped with terminals used for face recognition as well as fingerprint readers.

Typically, the face recognition is done by analyzing a face image obtained by taking a picture a subject user. In connection to a method for a face recognition, there has been disclosed a method to extract a face pattern and to recognize a face corresponding to the change in face expression, which leads to an application to various services related to the face recognition.

However, in conducting the face recognition service, any face images that have been photographed in the form of a moving image may be used to recognize or register a face of the user. If this is the case, even frames having a predetermined quality level or less may be used to recognize or register a face of the user. Accordingly, this may cause an increased load of the terminal used for face recognition or registration.

SUMMARY OF THE INVENTION

In view of the above, the present invention provides a method for a face recognition which defines at least one quality factor and employs a frame that meets a predetermined quality criteria as a sample image for face registration using the quality factor, thereby reducing time taken to and load required for the face registration or the face recognition. However, the technical problem of the embodiment is not limited to the aforementioned technical problem, and other technical problems may exist, as well.

In accordance with a first aspect of the present invention, there is provided a method for a face recognition by a face recognition service server. The method includes: receiving a face image that is photographed from a face registration terminal or a face recognition terminal; detecting a face area of the received face image; quantifying at least one quality factor for the detected face area in order to determine whether the received face image is suitable as sample image required for face recognition; and selecting the received face image as the sample image required for the face recognition when the quality factor satisfies a predetermined quality criterion.

In accordance with a second aspect of the present invention, there is provided a method for providing an application that is operated in cooperating with a face recognition server for carrying out a method for a face recognition, and the face recognition service apparatus executes the method described above.

In accordance with any one aspect of the aforementioned technical solutions of the present invention, it is possible to reduce the time taken to and load required for the face registration or the face recognition by defining at least one quality factor and not employing a frame that does not meet the predetermined quality criteria as the sample image using the quality factor.

BRIEF DESCRIPTION OF THE DRAWINGS

The above and other objects and features of the present invention will become apparent from the following description of the embodiments given in conjunction with the accompanying drawings, in which:

FIGS. 4A and 4B are sequential diagrams illustrating a process of transmitting and receiving data between components in the system for a face recognition in accordance with an embodiment of the present invention.

DETAILED DESCRIPTION OF THE EMBODIMENTS

Hereinafter, the embodiment of the present invention will be described in detail with reference to the accompanying drawings which form a part hereof.

Throughout the specification and the claims, when an element is described as being "connected" to another element, this implies that the elements may be directly connected together or the elements may be connected through one or more intervening elements. Furthermore, when an element is described as "including" one or more elements, this does not exclude additional, unspecified elements, nor does it preclude the presence or addition of one or more other features, integers, steps, operations, elements, components and/or groups thereof.

Figure 1:
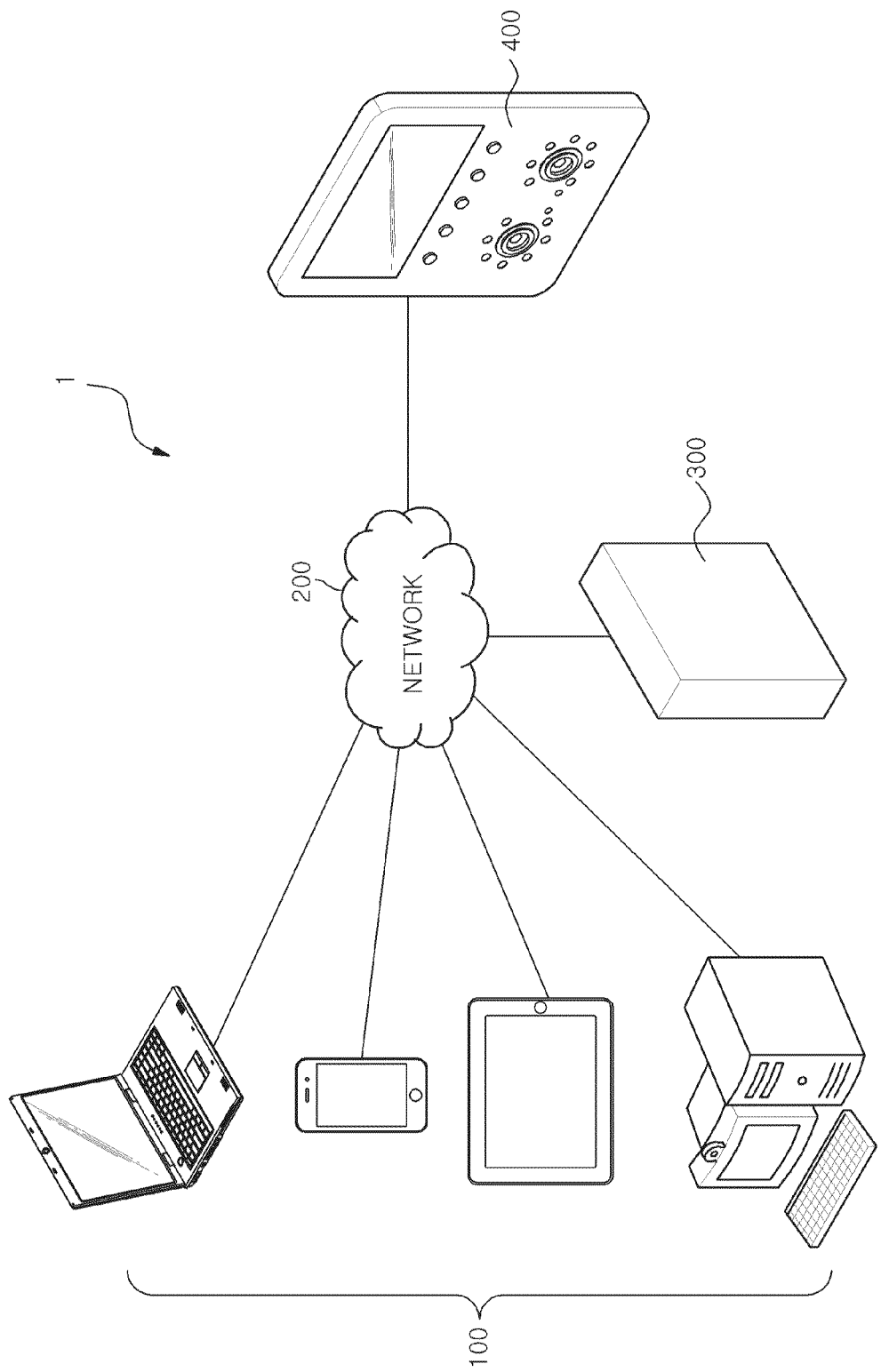
FIG. 1 is a configuration diagram of a system for a face recognition in accordance with an embodiment of the present invention.

FIG. 1 is a configuration diagram of a system for a face recognition in accordance with an embodiment of the present invention.

Referring to FIG. 1, a system for a face recognition 1 includes a face registration terminal 100, a face recognition service server 300, and a face recognition terminal 400. In this regard, the system for providing a face recognition service 1 is merely an exemplary embodiment of the present invention, and the present invention is not limited thereto.

All of the components shown in FIG. 1 may be connected all together via a network 200. For example, as illustrated in FIG. 1, the face registration terminal 100 and the face recognition service server 300 may be connected with each other via the network 200. Further, the face recognition service server 300 may be connected to the face recognition terminal 400 via the network 200. In addition, the face registration terminal 100 may also have a connection with the face recognition terminal 400 via the face recognition service server 300. Furthermore, the face registration terminal 100 may be used to obtain a face image of a user that is used for recognition of the user. Here, a camera provided on the face registration terminal 100 may be used to obtain the face image of the user.

The network 200 refers to a connection topology that enables information exchange between nodes such as terminals, servers, etc. The network 200 may be the Internet, LAN (Local Area Network), Wireless LAN (Wireless Local Area Network), WAN (Wide Area Network), PAN (Personal Area Network), 3G network, 4G network, LTE network, Wi-Fi network, or the like, but is not limited thereto. Further, the face registration terminal 100, the face recognition service server 300 and the face recognition terminal 400 are not limited to those illustrated in FIG. 1.

The face registration terminal 100 may be implemented by the terminal that is capable of connecting to a server or a terminal at a remote location via the network 200. For example, the face registration terminal 100 may be implemented by a computing device that is capable of connecting to a server or a terminal at a remote location via the network 200. Here, the computing device may be, for example, a notebook, a desktop computer, a laptop computer or the like on which a camera is mounted. Further, the face registration terminal 100 may be implemented by the terminal that is capable of connecting to a server or a terminal at a remote location via the network 200. The face registration terminal 100 may be, for example, a wireless communication device that guarantees portability, which may be any kind of handheld-based wireless communication devices such as terminals for PCS (Personal Communication System), GSM (Global System for Mobile communications), PDC (Personal Digital Cellular), PCS (Personal Handy-phone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet), smartphone, smartpad, tablet PC, and the like, but is not limited thereto.

The face recognition service server 300 registers at least one face image of a user received from the face registration terminal 100 and recognizes at least one face image of the user received from the face recognition terminal 400. In this regard, it may be possible to configure that the face recognition service server 300 is responsible for the database only, whereas the face recognition terminal 400 in itself performs a face recognition algorithm. Alternatively, it may be possible to configure that the face recognition terminal 400 merely performs a photographing task of a face of the user, whereas the face recognition service server 300 performs a face recognition algorithm. In this case, the face recognition service server 300 may be implemented by the server that is capable of connecting to another server or a terminal at a remote location via the network 200. For example, the face recognition service server 300 may be implemented by the computing device that is capable of connecting to another server or a terminal at a remote location via the network 200. Here, the computing device may be, for example, a notebook, a desktop computer, a laptop computer or the like on which a camera is mounted, but is not limited thereto. Similarly, the face registration terminal 100 may be implemented by the terminal that can be connected to a server or a terminal at a remote location via the network 200.

The face recognition terminal 400 obtains a face image of a user by photographing the user and sends the obtained face image to the face recognition service server 300. In this regard, it may be possible to configure that the face recognition terminal 400 carries out the face recognition algorithm in itself, or the face recognition terminal 400 obtains a face image of a user by photographing the user and sends the obtained face image to the face recognition service server 300.

For the letter case, the face recognition service server 300 may compare a face image that has been already registered in the database to a subject face image that is provided from the face recognition terminal 400 to perform the face recognition algorithm and sends the recognition result to the face recognition terminal 400. In this regard, the face recognition terminal 400 may be implemented by the terminal that can be connected to a server or a terminal at a remote location via the network 200. Further, the face recognition terminal 400 may be implemented by the terminal that can be connected to a server or a terminal at a remote location via the network 200.

A method for a face recognition will be explained by way of example as below.

In recent years, many cases are increasing to manage the attendance of employees and security of companies using fingerprint readers. Furthermore, many companies are getting adopted face recognition technologies to manage the people who access critical data and secret areas.

In the case of face recognition, unlike the fingerprint recognition, there may exist various factors that interface with the face recognition and there may occur situations where the quality of an image used for the face recognition changes depending on any environment and condition. In these cases, the face recognition may not be done successfully. Moreover, if a face recognition algorithm is practiced to any frames which may possibly reduce the quality of the face recognition, the terminal may then be subject to excessive load to carry out the face recognition algorithm.

Thus, in accordance with an embodiment of the present invention, in recognizing the face image, a method for a face recognition is provided in which at one or more quality factors are defined and a frame in which the quality factor(s) does not meet predetermined quality criteria, or the sum of the quality factors do not satisfy a predetermined quality criteria is removed from the image registration or image recognition. Therefore, the image that passes the predetermined quality criteria is employed in the image registration or face recognition, thereby reducing the load on the server. In addition, the factors that interfere with the face recognition are feed-backed to a user so that the user can adjust the controls to satisfy the predetermined quality criteria, thereby producing an optimal face image.

Figure 2:
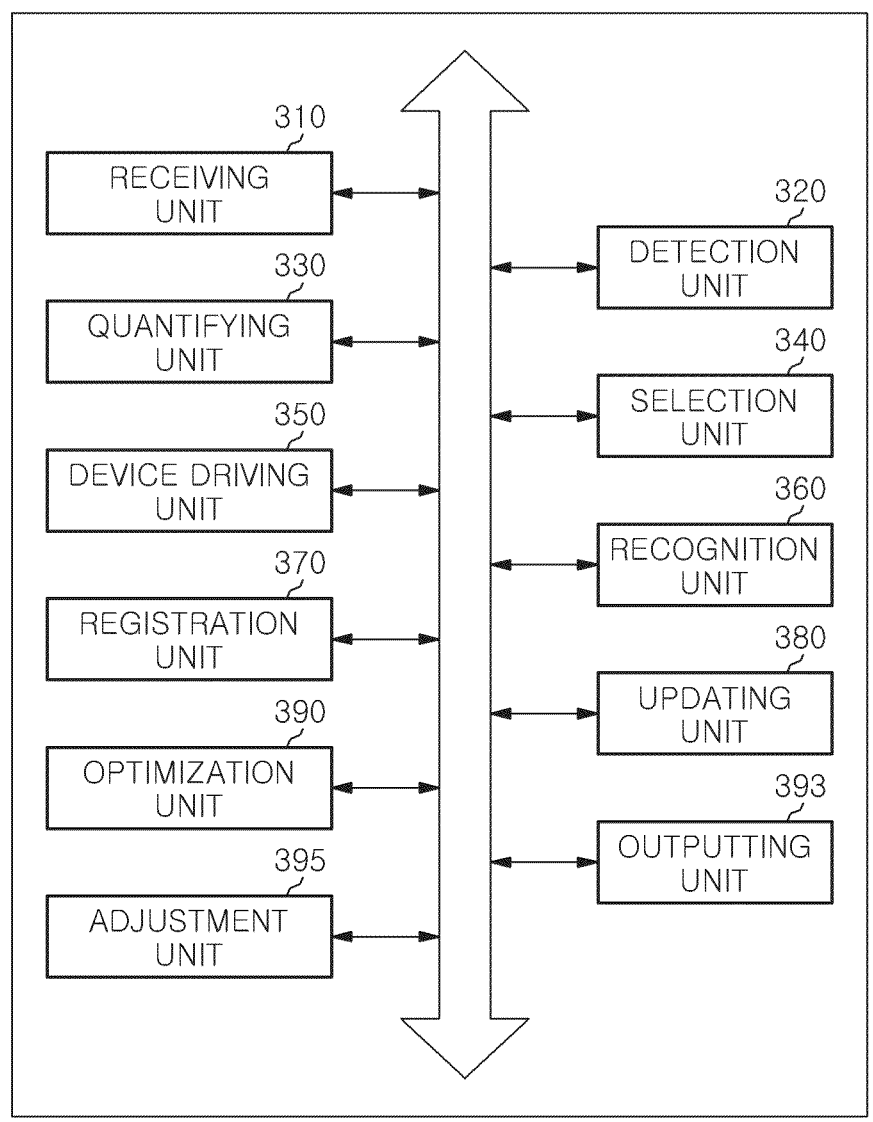
FIG. 2 is a block diagram of the face recognition service server shown in FIG. 1.
Figure 3A:
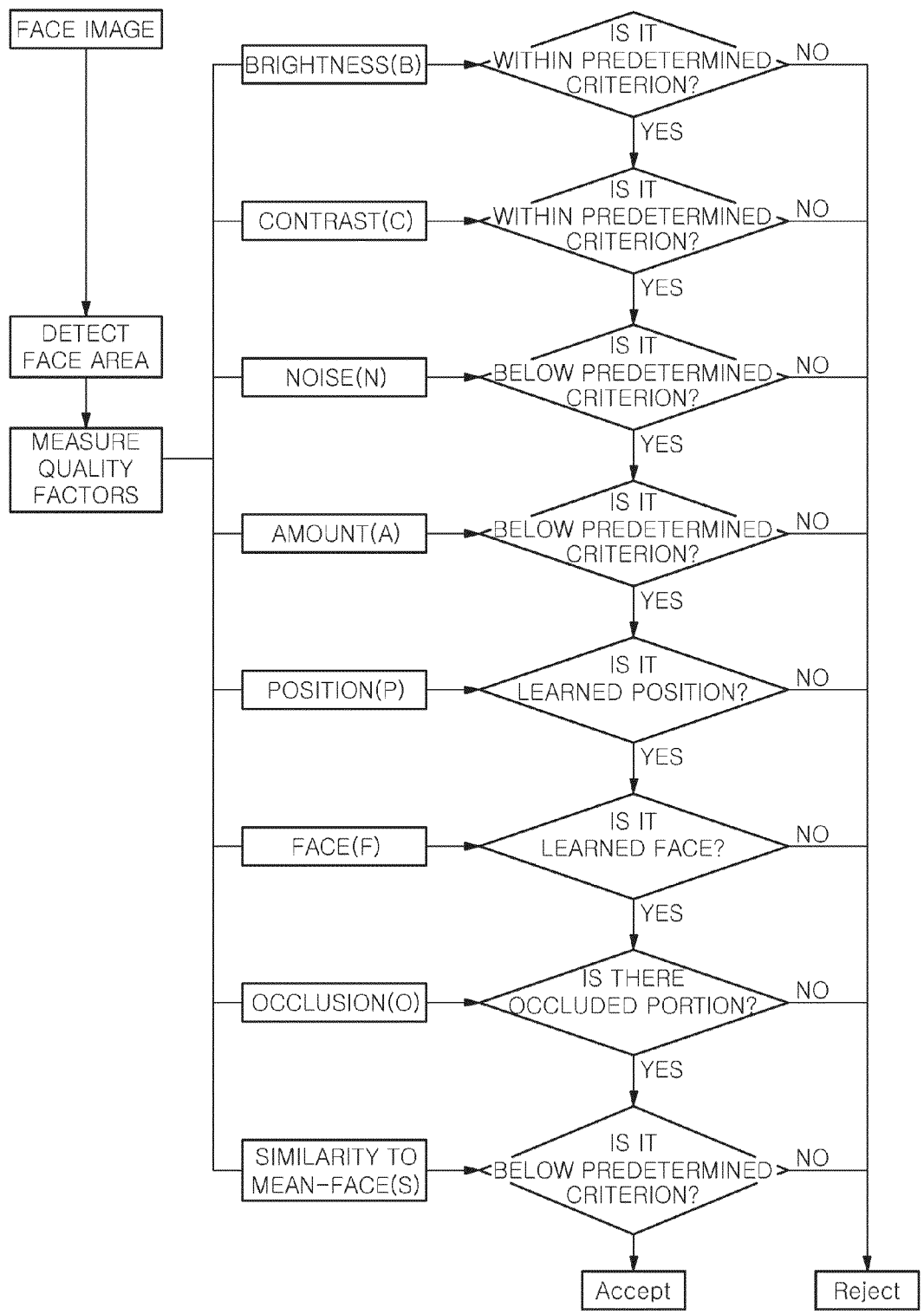
FIGS. 3A and 3B are flow diagrams illustrating first and second methods to determine whether the face image that is received is selected as the sample image in accordance with an embodiment of the present invention.
Figure 3B:
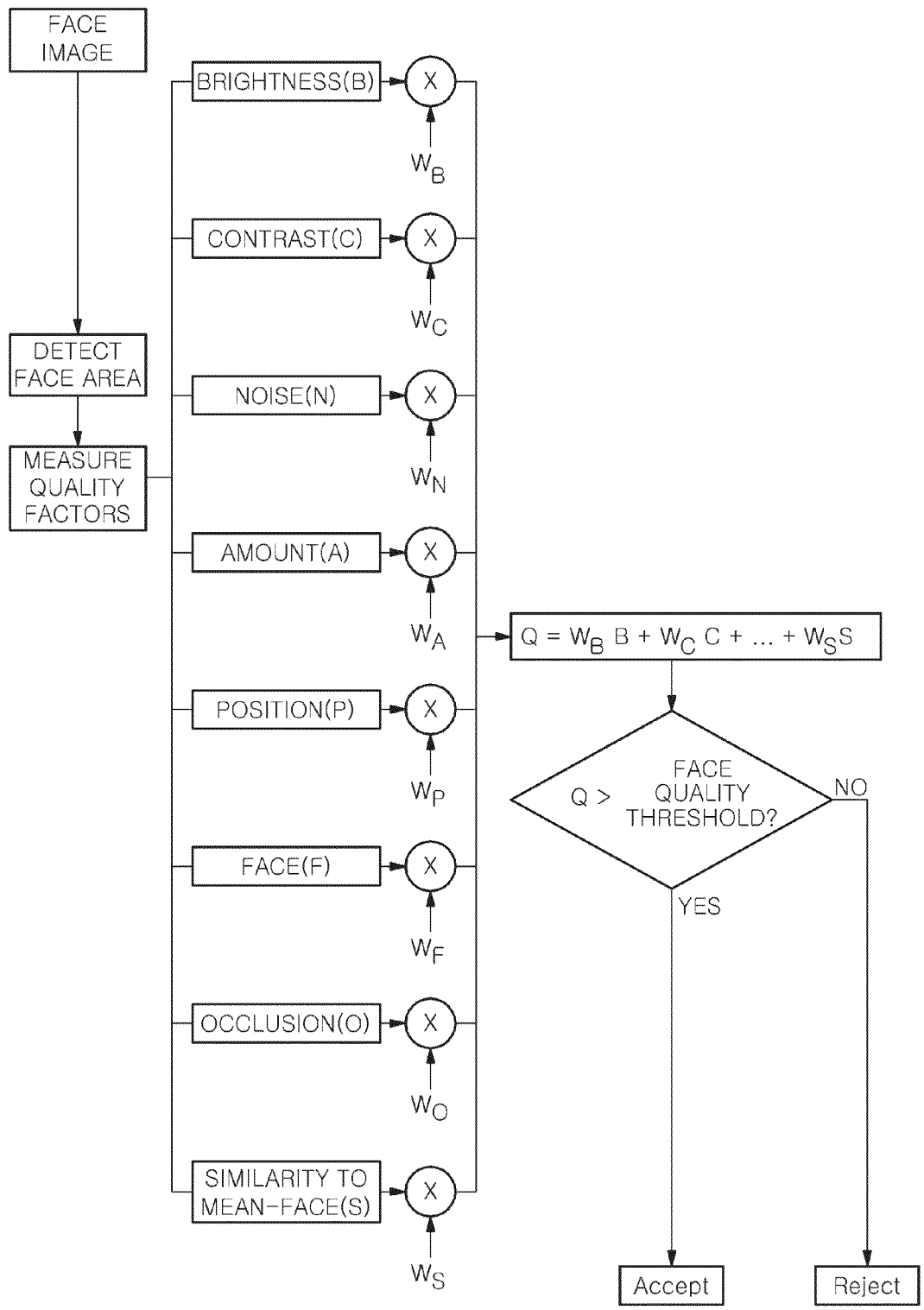

FIG. 2 is a block diagram of the face recognition service server shown in FIG. 1; and FIGS. 3A and 3B are flow diagrams illustrating first and second methods to determine whether the face image that is received is selected as the sample image in accordance with an embodiment of the present invention.

Referring to FIG. 2, the face recognition service server 300 in accordance with an embodiment includes a receiving unit 310, a detection unit 320, a quantifying unit 330, and a selection unit 340. In this regard, Further, the face recognition service server 300 further includes at least any one of a device driving unit 350, a recognition unit 360, a registration unit 370, an updating unit 380, an optimization unit 390, an outputting unit 393, and an adjustment unit 395.

The face recognition service server 300 or another server (not shown) that is cooperating with the face recognition service server 300 may transmit an application, program, web page for a facial recognition service, or the like to the face registration terminal 100 or the face recognition terminal 400. In response thereto, the face registration terminal 100 or the face recognition terminal 400 may open the application, program, web page for a face recognition service or the like or may install it. Further, the face recognition service program may be run on the face registration terminal 100 or the face recognition terminal 400 through the use of scripts being executed in a web browser. Here, the web browser may be a program that makes the WWW (World Wide Web) service usable and receives and displays the HyperTexts in HTML (Hyper Text Mark-up Language). As an example, the web browser may include an application such as Netscape, Explorer, Chrome, and the like. The application refers to an application running on the terminal, which may be, for example, 'apps' that are running on mobile terminals such as smartphones. The app may be downloaded from mobile application markets of a virtual marketplace and freely installed in the terminal.

The connection to the network 200 means that the face registration terminal 100, the face recognition service server 300, and the face recognition terminal 400 are communicatively connected to each other, and the connection establishment to the network 200 means that the face recognition service server 300 generates a communication object at a communication contact for the communication with the terminal that is connected to the network 200. The face recognition service server 300 may exchange data through the communication object.

The receiving unit 310 receives the face image of a user that is photographed by the face recognition terminal 100 or the face recognition terminal 400. In this case, the face registration terminal 100 may photograph the face image of the user, which will be registered for face recognition, in the form of moving image data or picture data. Also, the face recognition terminal 400 may photograph the face image of the user, which will be used in face recognition, in the form of moving image data or picture data.

The detection unit 320 detects a face area from the received face image. The quantifying unit 330 quantifies or measures the detected face area based on one or more quality factors in order to determine whether the received face image is appropriate as sample image for face recognition. Here, the quality factor may include at least one or more of following: brightness, contrast, amount, position, face, occlusion, and noise of the detected face area, and a similarity to a mean-face. In this case, the criterion to determine whether to accept the received face image as the sample image may be differently applied to the process of face recognition and the process of face registration. For example, a higher level of the quality factors may be required in the process of face registration rather than the process of face recognition because the process of face registration is a basic for user identification.

The brightness (B) is a quality factor configured to perceive something that becomes saturated since the detected face area is too bright or becomes invisible since the detected face area is too dark. The brightness may be quantified by dividing the detected face area into a plurality of partial areas, calculating the averaged brightness of the partial areas, and selecting either a maximum value or a minimum value of the averaged brightness that are calculated for the partial areas.

The contrast (C) refers to a brightness distribution within the detected face area, and is a quality factor configured to represent how various changes in brightness are included in the detected face image and how much it expresses information of the face. The contrast can be quantified based on the difference between a minimum brightness and a maximum brightness of the detected face area or a specific part of the detected face area.

The amount (A) is a quality factor configured to distinct the case where the size of the detected face area is too small due to the far distance from a camera and thus information is insufficient to identify the face, or the size of the detected face area is too large to confine in a processing zone. Therefore, the quality factor based on the amount accepts the face image having the size suitable for face recognition, which results in that recognition performance of the face image is enhanced and unnecessary processing is minimized. Further, in order to quantify the amount, it is necessary to calculate the area of the face area, which can be done in a way that counts the number of pixels in the face area.

The position (P) is a quality factor configured to fit a face of a user in the direction or orientation that is learned (e.g., a center, left and right sides, upper and lower sides) so that the recognition rate can be improved. Various methods to quantify the position has been studied and known in the field of face image processing; therefore, a detailed description thereof is omitted.

In the quality factor of face (F), the change in the expression of the face is one of the factors to lower the performance of face recognition. Therefore, the quality factor based on the face may be configured to select only the expression of the face that is learned so that the selected expression of the face can be adopted in the face recognition. If a user does not take the expression of the face that is learned, a feedback may be provided to the user to change the expression of the face. Various methods to quantify the expression of the face has been studied and known in the field of face image processing; therefore, a detailed description thereof is omitted.

The occlusion (O) is a quality factor configured to locate the components to degrade the face recognition performance, such as sunglasses, mufflers, scarves, masks, eye mask, or the like. If the face recognition does not work well due to a partial occlusion, it is possible to provide a feedback of the situation of the occlusion to a user so that the user can take any action, thereby improving the face recognition performance.

The noise (N) is a quality factor configured to measure the noise produced by image sensors in any kind of image-based recognition systems. Noise is closely related to ambient luminance in the image acquisition. For example, the noise increases as the luminance becomes low. Thus, it is possible to control the brightness of the lighting or to adjust the exposed length of the camera by measuring the noise level, thereby improving the face recognition performance.

The similarity (S) to the mean-face is a quality factor configured to measure the similarity to the mean-face that has already been registered. The mean-face can be obtained from the mean value of the face images that have already been registered. If the face images that have been registered are few, the mean-face may be substituted with the averaged value of the face images that was used previously in the course of learning the face recognition algorithm. The mean-face may be produced in a way of averaging the face images that are already registered or the face images that are photographed in advance. Further, the similarity to the mean-face may be determined by comparing the mean-face and the face image of the user.

The selection unit 340 selects the received face image as the sample image when at least one or all of the quality factors that are quantified for the detected face area meet a predetermined quality criterion. How to select the sample image by the selection unit 430 is categorized into two methods, which will be described with reference to FIGS. 3A and 3B.

FIG. 3A shows a first method of selecting the sample image wherein a predetermined quality criterion is defined for each quality factor.

For example, when the quality factor of the detected face area does not satisfy the predetermined quality criterion, the received face image is not selected as the sample image for face recognition. Referring to FIG. 3A, it can be seen that the received face image cannot be approved as the sample image for face recognition or registration when any one of the quality factors, such as brightness, contrast, amount, position, face, occlusion, and noise of the detected face area, and similarity to a mean-face, that are quantified for the detected face area does not satisfy the predetermined quality criteria on a quality factor basis. As such, the method for a face recognition of the embodiment selects the received face image as the sample image only if all of the quality factors of the detected face area meet their respectively corresponding predetermined quality criteria.

On the other hand, FIG. 3B shows a second method of selecting the sample image wherein a weight is given to each quality factor. The weighted quality factoring is compared to a predetermined quality threshold, and the received face image is determined whether to be approved as the sample image depending on whether the weighted quality factor meets the predetermined quality threshold. The weight to the quality factor may be varied as the case may be. It can be seen from FIG. 3B that if the total sum value Q of the quality factors to which weights are given does not exceed the predetermined quality threshold, the received face image is not selected as the sample image.

Referring back to FIG. 2, the device driving unit 350 drives the device which may be capable of controlling the quality factor that does not satisfy the predetermined quality criterion.

For example, in the case where the quality factor of the detected face area may be any one of the brightness, contrast and noise, the photographing settings of the face registration terminal 100 or the face recognition terminal 400 may be controlled in an optimized value in accordance with the quality factor that is quantified. For example, if it is too bright or dark, it is possible to control the lighting component of the face registration terminal 100 or the face recognition terminal 400, make an ambient luminance brighter or darker in relation to the ambient light, or adjust the exposure length of a camera sensor.

Further, in the case where the quality factor of the detected face area is any one of the position, face and occlusion, a feedback may be provided to a user so that the user can control any one of the position, face and occlusion. For example, in the case where a face image of a user with a smile was photographed when it was registered after joining a company, but a face image for attendance confirmation has a drawn face, a feedback such as "Please, smile" may be provided to the user through a speaker. Also, for example, in the case where a face image of a user with a braided hair was photographed when it was registered after joining a company, but a face image for attendance confirmation shows a figure wearing a hat, a feedback such as "Please take off your hat" may be provided to the user through a speaker.

The recognition unit 360 performs the face recognition on a face image selected as the sample image that has passed the predetermined quality criteria among the face images of several frames. The face image of the user may be obtained from the moving image data or picture data that is photographed by the face recognition terminal 400 wherein the moving image data having a plurality of frames.

The registration unit 370 performs the face registration on the face image with the highest image quality selected as the sample image that has passed the predetermined quality criteria among the face images across several frames. The face image of the user may be obtained from the moving image data or picture data that is photographed by the face recognition terminal 400.

The updating unit 380 serves to update a previously registered face image with a portion of the face image selected as the sample image when the similarity of the registered face image and the selected face image is below a predetermined similarity value. For example, assuming that an employee of 'A' was joined in a company at the age of 24 and the employee is 40 years old at present, the change in the appearance of the user such as wrinkles may occur naturally over time. Thus, when the similarity between the registered face image and the selected face image is lower than a predetermined similarity value, the registered face image may be partially updated using the selected face image, thereby keeping track of the face change.

The optimization unit 390 is used to optimize the photographing settings of the face registration terminal 100 or the face recognition terminal 400 based on the quality factor that is quantified. For example, in the case where the quality factor of the detected face area is any one of the brightness, contrast and noise, the lighting equipped in the face registration terminal 100 or the face recognition t terminal 400 may be controlled in an optimal value or the exposure length of the camera mounted on the face registration terminal 100, or the face recognition terminal 400 may be adjusted in an optimal value.

The output unit 393 provides a feedback to a user so that the user can adjust the position, expression of a face, or occlusion based on the quality factor that is quantified, through the face registration terminal 100 or the face recognition terminal 400. Such a feedback may be outputted in the form images, symbols, signs, or the like through the use of displays, or in the form of voice, beep sound and the like through the use of a speaker, etc.

The adjustment unit 395 increases the exposure time of the camera in the face registration terminal 100 or the face recognition terminal 400 or controls the intensity of the lighting in the face registration terminal 100 or the face recognition terminal 400 based on the noise that is quantified. The quality factor may be the luminance that is quantified on the basis of noise from the face registration terminal 100 or the face recognition terminal 400.

As described above, in the process of the face recognition performed in the face recognition terminal 400, the face image for recognition is selected as the sample image that passes the predetermined quality criterion among the face images across frames inputted continuously in the form of moving image data. As such, since any frames which may possibly reduce the quality of the face recognition are not involved in the face recognition, it is possible to reduce the load on the processors, which leads to the possibility of the face recognition in low-level processor and the improvement of the recognition rate. Furthermore, the best quality image can be screened when acquiring a face image to be registered in the face registration terminal 100, whereby it is possible to improve the recognition performance of the face recognition terminal 400.

In accordance with an embodiment of the present invention, one or more quality factors are defined, and when each of the quality factors of the detected face area does not meet its corresponding predetermined quality criterion or the summation of all quality factors of the detected face area does not satisfy the predetermined quality threshold, the received face image is removed from the face recognition. Therefore, since the face image that passes the predetermined quality criterion is used in the face recognition, it is possible to reduce the load on the processors. Further, a user is provided with factors which hinder in the face recognition as feedback, so that one or more devices can be adjusted in order to satisfy the predetermined quality criteria in response to the feedback, thereby achieving an optimal face recognition.

Further, details of the method for a face recognition illustrated in FIGS. 2 and 3 will not be described since the similar or identical description has already been made with reference to FIGS. 1 to 3 and can be easily inferred from that description.

Figure 4A:
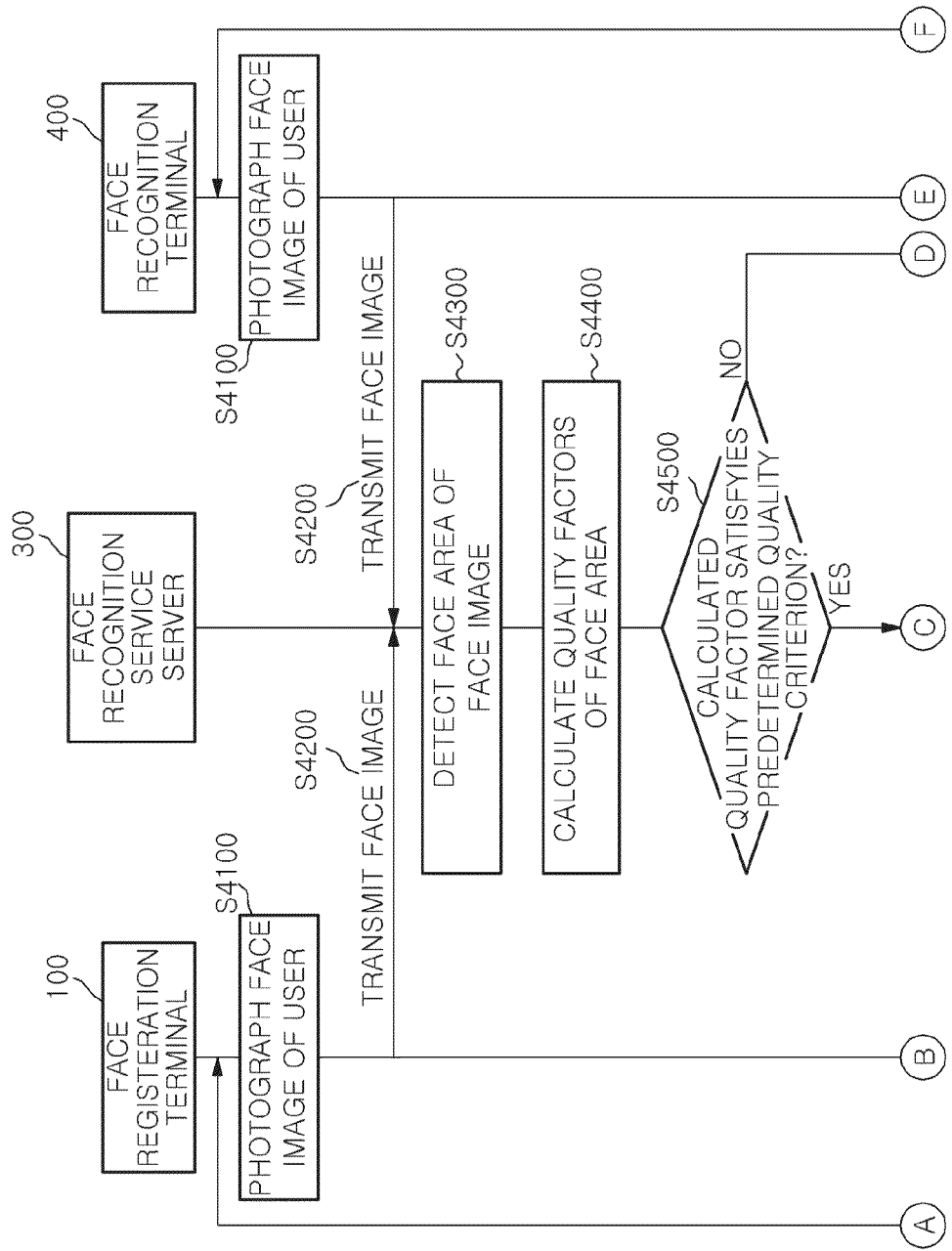

FIGS. 4A and 4B are sequential diagrams illustrating a process of transmitting and receiving data between components in the system for a face recognition in accordance with an embodiment of the present invention. An embodiment of the process of transmitting and receiving data will be explained with reference to FIGS. 4A and 4B below; however, the present invention does not intend to construe that the present invention is limited to the embodiment, and it will be apparent to those having skilled persons that the process of transmitting and receiving data as illustrated in FIGS. 4A and 4B may be changed in accordance with a variety of embodiments as set forth above.

Referring to FIGS. 4A and 4B, the face registration terminal 100 or the face recognition terminal 400 photographs the face image of the user in block 54100, and the face image of the user is sent to the face recognition service server 300 in block 54200.

The face recognition service server 300 receives the face image and detects a face area of the received face image in block 54300, and quantifies quality factors for the detected face area in block 54400.

When it is determined that any one of the quality factors does not satisfy the predetermined quality criteria in block 54500, one or more the quality factor that does not satisfy the predetermined quality criteria is extracted in block 54600, and a driving signal, which will be used to optimally control the extracted quality factor that does not satisfy the predetermined quality criteria, is produced in block 54700. Thereafter, the face recognition service server 300 provides the driving signal to the face registration terminal 100 or the face recognition terminal 400, in block 54800, which in turn drives a relevant device in block 54900.

Meanwhile, when it is determined that all of the quality factors satisfies the predetermined quality criteria in block 54500, a flow goes to block 54910 where the face recognition service server 300 selects the received face image as the sample image required for face recognition. Next, the face recognition service server 300 performs the face registration or the face recognition on the received face image in block 54930, and transmits the recognition result to the face registration terminal 100 or the face recognition terminal 400 in block 54950.

Finally, the face registration terminal 100 or the face recognition terminal 400 outputs the recognition result in block 54970. The recognition result will be the determination as to whether the user is the registered user, which may be outputted in the form of a notice or an alarm.

Further, details of the method for a face recognition illustrated in FIGS. 4A and 4B will not be described since the similar or identical description has already been made with reference to FIG. 1 to FIG. 3B and can be easily inferred from that description.

The order of aforementioned blocks 54100 to 54970 is merely exemplary and is not limited thereto. In other words, the order of aforementioned blocks 54100 to 54970 may be varied or some among the blocks may be carried out simultaneously or removed.

Figure 5:
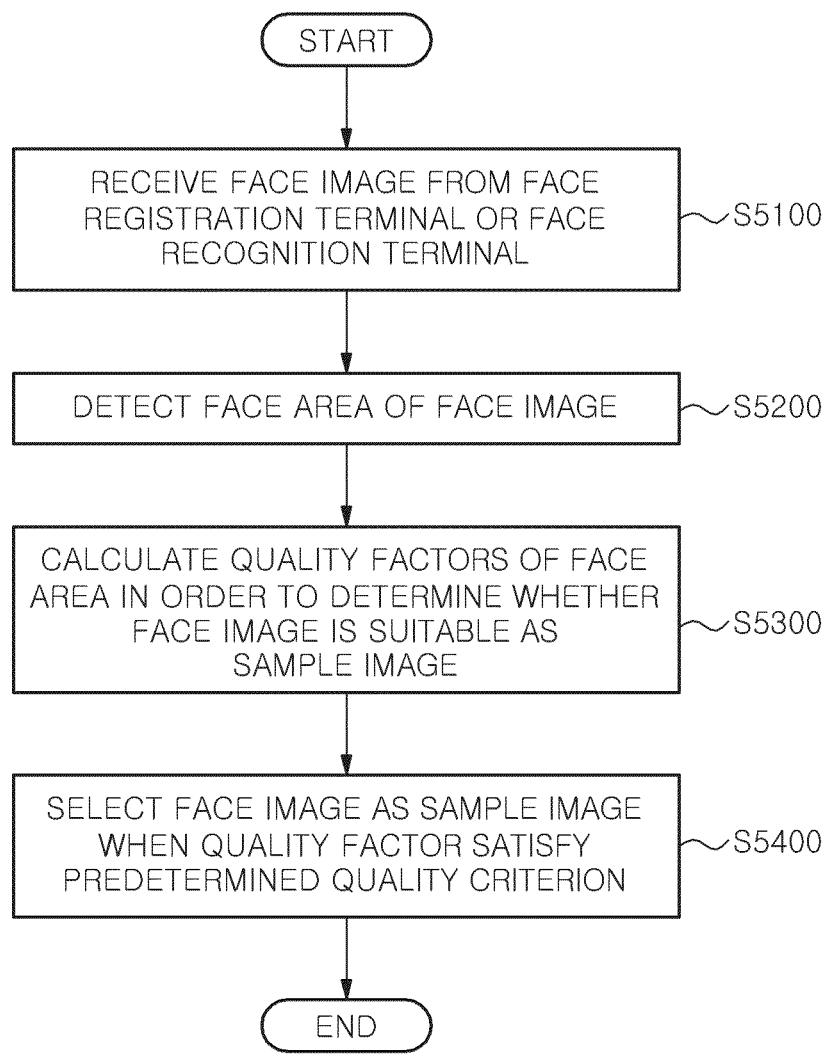
FIG. 5 is a flow chart illustrating a method for a face recognition in accordance with an embodiment of the present invention.

FIG. 5 is a flow chart illustrating a method for a face recognition service in accordance with an embodiment of the present invention.

A face image is received from the face registration terminal 100 or the face recognition terminal 400 in block 55100.

Next, a face area is detected from the received face image in block 55200.

At least one quality factor for the detected face area are quantified in order to determine whether the received face image is suitable as the sample image in block 55300.

Subsequently, when the at least one quality factor satisfies the predetermined quality criterion, the received face image is selected as the sample image required for face recognition in block 55400.

Further, details of the method for a face recognition illustrated in FIG. 5 will not be described since the similar or identical description has already been made with reference to FIG. 1 to FIG. 4B and can be easily inferred from that description.

The method for a face recognition of the embodiment described in FIG. 5 may be implemented in the form of recording media including instructions executable by a computer, such as applications or program modules that are executed by a computer. The computer readable media may be any available media that can be accessed by a computer and may include volatile and nonvolatile media, and removable and non-removable media. Further, the computer readable media may include any computer storage media and communication media. The computer storage media may include any volatile and nonvolatile media and removable and non-removable storage media that are implemented in any methods or technologies for the storage of information such as data and computer-readable instructions, data structures, program modules, or other data. The communication media may include a transport mechanism or any information delivery media for transmitting computer readable instructions, data structures, program modules or other data of modulated data signal such as carrier waves.

As described above, the method for a face recognition in accordance with the embodiment of the present invention may be executed by the application that is installed by default in the terminal (which may include a program included in platforms, operating systems, or the like mounted by default on the terminal), or may be performed by the application (that is, program) that is installed directly on a master terminal by a user through application store server or an application provider server such a Web server, which is associated with the application or the corresponding service. In this sense, the method for a face recognition in accordance with the embodiment of the present invention may be installed by default on the terminal, or may be implemented in an application (i.e., a program) that is directly installed by a user, or may be recorded on a computer-readable recording medium.

Description of the present invention as described above are intended for illustrative purposes, and it will be understood to those having ordinary skill in the art that this invention can be easily modified into other specific forms without changing the technical idea and the essential characteristics of the present invention. Accordingly, it should be understood that the embodiments described above are exemplary in all respects and not limited thereto. For example, respective components described to be one body may be implemented separately from one another, and likewise components described separately from one another may be implemented in an integrated type.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for a face recognition by a face recognition service server, the method comprising:
   receiving a face image that is photographed from a face registration terminal or a face recognition terminal;
   detecting a face area of the received face image;
   quantifying at least one quality factor for the detected face area in order to determine whether the received face image is suitable as sample image required for face recognition;
   selecting the received face image as the sample image required for the face recognition when the quality factor satisfies a predetermined quality criterion; and
   causing a device relevant to a quality factor that does not satisfy the predetermined quality criterion to drive when the quality factor does not satisfy the predetermined quality criterion.

2. The method of claim 1, wherein the predetermined quality criterion is defined on a quality factor basis,
   when at least one quality factor does not satisfy the predetermined quality criterion, the received face image is not selected as the sample image.

3. The method of claim 1, wherein a weight is given to the quality factor for the detected face area,
   as a result of the comparison of the quality factor for the detected face area calculated using a weight and the predetermined quality criterion, when the quality factor satisfies a predetermined quality threshold, the received face image is selected as the sample image.

4. The method of claim 1, wherein the at least one quality factor comprises one of brightness, contrast, amount, position, facial expression, occlusion, and noise of the detected face region, and a similarity to a mean-face.

5. The method of claim 1, wherein the face image of the user is moving image data that is photographed by the face recognition terminal,
   wherein the method further comprising:
   performing a face recognition service method on frames in the moving image data to select a face image of a frame as the sample image to be used for face recognition.

6. The method of claim 5, wherein the at least one quality factor comprises any one of position, face and occlusion of the detected face area,
   wherein the method further comprising:
   outputting a feedback so that any one the position, face, occlusion can be adjusted in the face registration terminal or the face recognition terminal based on the quality factor that is quantified.

7. The method of claim 1, wherein the face image of the user is moving image data or picture data that is photographed by the face registration terminal,
   wherein the method further comprising:
   performing a face recognition service method on frames in the moving image data or the picture data to select a face image of a frame which has the highest quality based on the quality factor as the sample image to be used for face recognition.

8. The method of claim 1, wherein the face image of the user is moving image data or picture data that is photographed by the face recognition terminal,
   wherein the method further comprising:
   updating a face image that has been registered with a portion of the received image selected as the sample image so that the registered face image can be matched to the received image when a similarity between the registered face image and the received face image is below a predetermined similarity value.

9. The method of claim 1, wherein the at least one quality factor comprises any one of brightness, contrast, and noise of the detected face area,
   wherein the method further comprising:
   optimizing the photographing settings of the face registration terminal or the face recognition terminal in accordance with the quality factor that is quantified.

10. The method of claim 1, wherein the at least one quality factor comprises any one of brightness and contrast of the detected face area,
    wherein the brightness is quantified by dividing the detected face region into a plurality of partial areas, calculates the averaged brightness of the partial areas, and selecting either a maximum value or a minimum value of the averaged brightness that is calculated for the partial areas, and
    the contrast is quantified on a basis of the difference between minimum brightness and maximum brightness of the detected face area or a specific part of the detected face area.

11. The method of claim 1, wherein the at least one quality factor comprises luminance of the detected face area,
    wherein the luminance is quantified on a basis of noise that is sensed by the face registration terminal or the face recognition terminal,
    wherein the method further comprising:
    increasing the photographing exposure time of the face registration terminal or the face recognition terminal, or adjusting the intensity of the lighting in the face registration terminal or the face recognition terminal.

12. The method of claim 1, wherein the at least one quality factor comprises a similarity to the mean-face of the detected face area,
    wherein the mean-face is obtained by averaging the face images that are already registered or the face images that are photographed in advance,
    the similarity to the mean-face is quantified by comparing the mean-face and the face image of a user.

13. A method for providing an application that is operated in cooperating with a face recognition server for carrying out a method for a face recognition,
    wherein the face recognition service apparatus executes the method described in claim 1.

* * * * *